United States Patent [19]

Keys

[11] 4,008,687
[45] Feb. 22, 1977

[54] SLEEPING NOOK FOR HOUSE PET

[76] Inventor: Francis Jackson Keys, 9532 Cortada, El Monte, Calif. 91733

[22] Filed: Sept. 17, 1975

[21] Appl. No.: 614,134

[52] U.S. Cl. .................................... 119/1; 119/19
[51] Int. Cl.² ......................................... A01K 1/02
[58] Field of Search .............................. 119/1, 19

[56] References Cited

UNITED STATES PATENTS

| | | | |
|---|---|---|---|
| 1,887,108 | 11/1932 | Steese | 119/19 |
| 2,032,248 | 2/1936 | Bins | 119/1 |
| 3,842,454 | 10/1974 | Young | 119/1 |
| 3,934,552 | 1/1976 | Kulka | 119/19 |

Primary Examiner—Hugh R. Chamblee
Attorney, Agent, or Firm—John T. Matlago

[57] ABSTRACT

An oversized slipper is adapted to provide a sleeping nook for a house pet. The heel of the sole is provided with a fastener portion on the outer end thereof so that when the heel portion of the sole is turned up it can be fastened to a mating fastener portion on the upper edge of the vamp of the slipper to provide an enclosure which serves as a sleeping nook for a house pet.

4 Claims, 10 Drawing Figures

U.S. Patent Feb. 22, 1977 Sheet 1 of 2 4,008,687
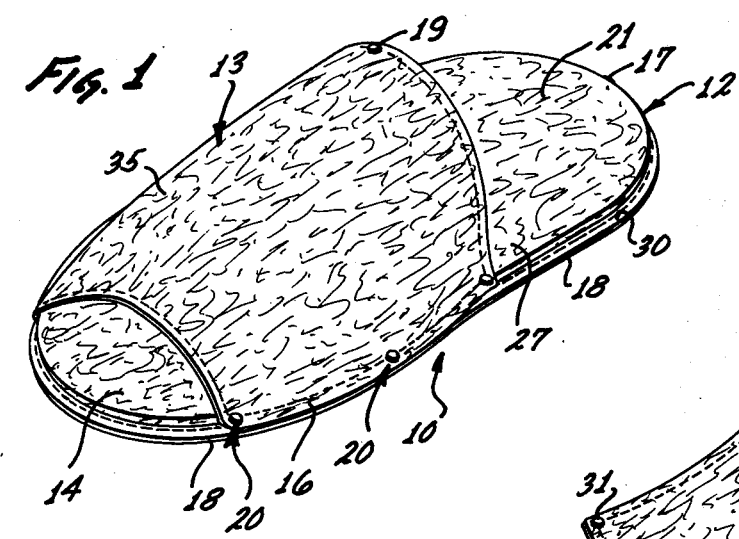
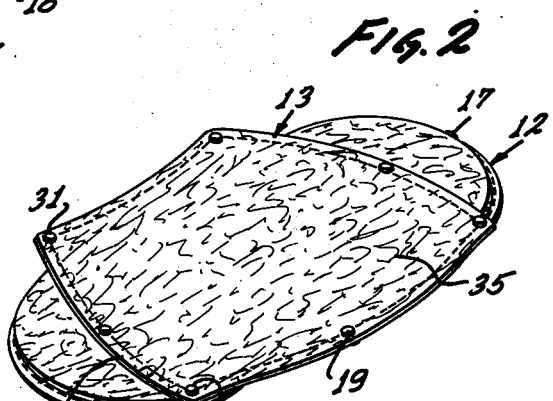
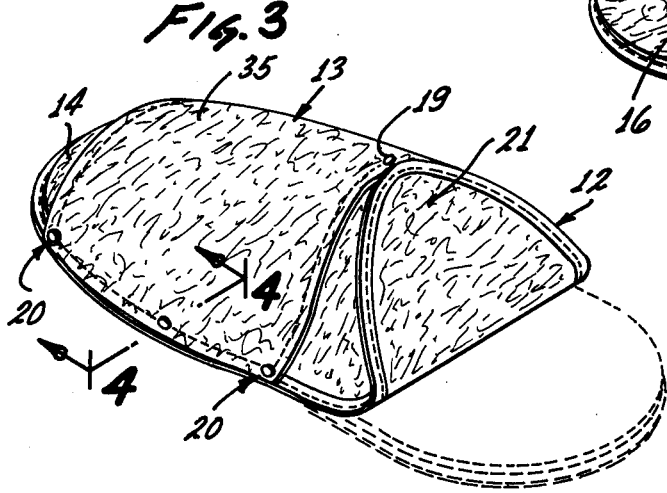
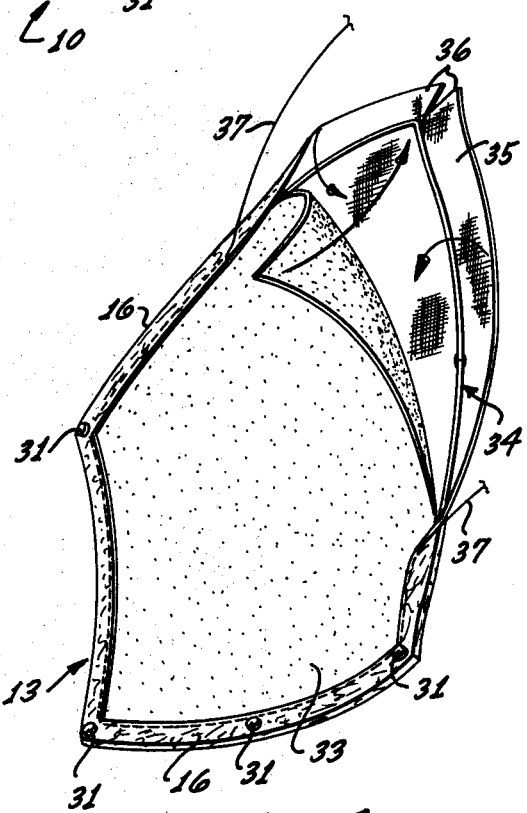
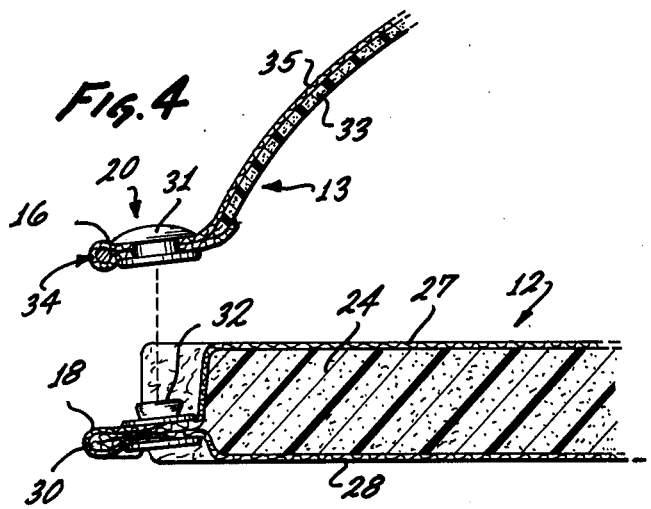

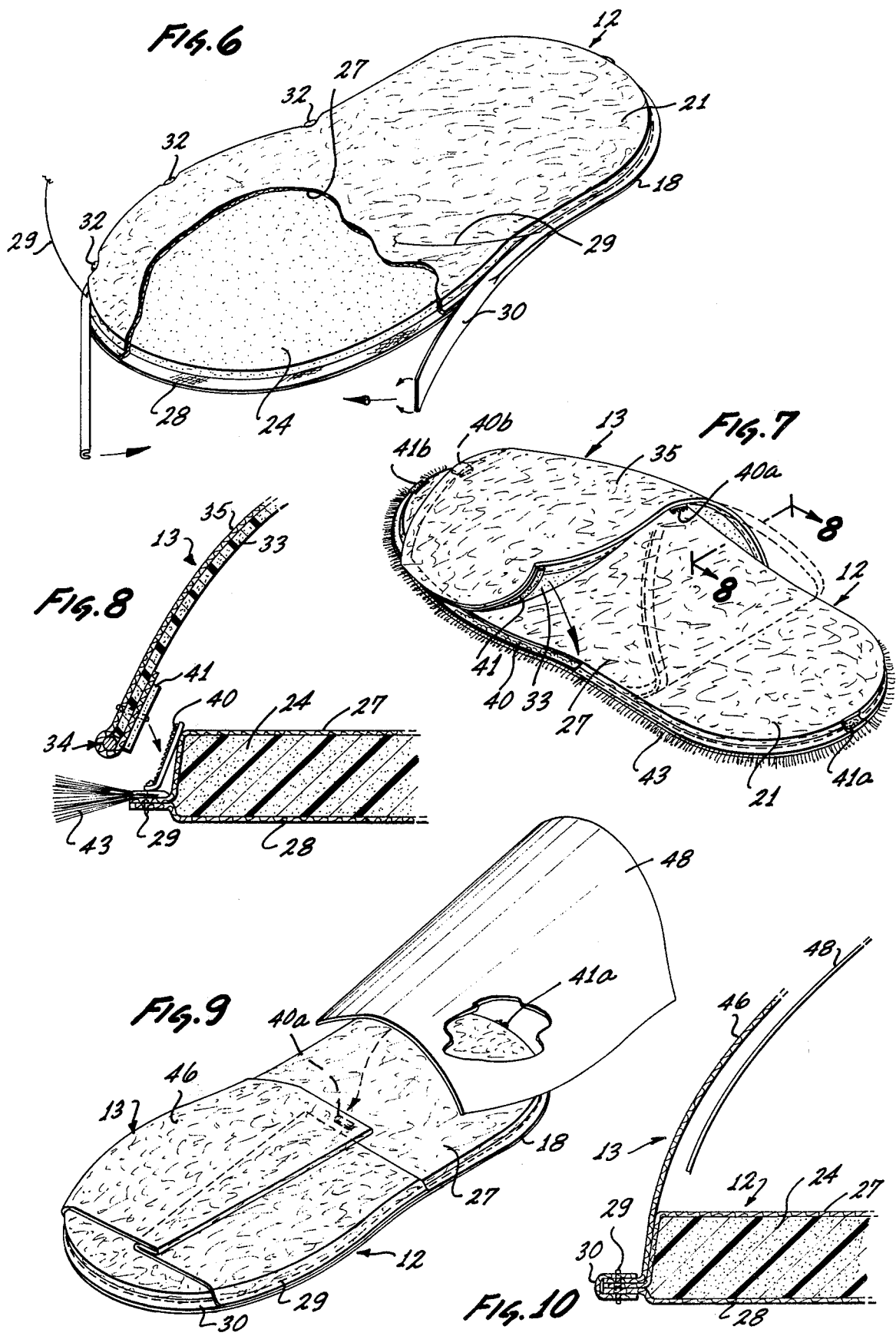

SLEEPING NOOK FOR HOUSE PET

This invention relates to a structure providing a sleeping nook for house pets and, more particularly, to an oversized slipper useful for such purpose.

House pets, such as cats and small dogs have a great liking for a secure, cozy, warm, soft nook in which to curl up and sleep. To provide such a structure for use within the home, such as in the family room, for example, it should be preferably ornamental in appearance so as to be pleasing to the eye. Moreover, such a structure should be readily assembled and disassembled not only for economy in shipping but also for ease in storing when not in use. The fact that a sleeping nook structure may have such an appearance that it is an attraction in itself, i.e., that it is conversation piece, greatly adds to its appeal.

The slipper of the present invention meets the above objective of a house pet sleeping nook structure in that it is familarly shaped and quickly recognizable object. It is highly distinctive in appearance, however, in that it is many times oversized. Thus the sole of the slipper of the present invention is typically two to three feet in length and the vamp is relatively oversized such that the closure it forms provides a nook large enough for the pet. The toe of the slipper is preferably open so that the nook formed by the vamp is well ventilated. In addition, the back edge of the heel of the sole is provided with a fastener portion such that the heel portion may be folded upwardly and fastened to a mating fastener portion on the upper edge of the vamp. The closing off of the vamp opening with the heel portion in this manner provides an even more confining nook for the pet animal while still providing sufficient openings on either side of the slipper for permitting the pet to peer out and/or work his way out of the confining nook if he so desires.

With the above and related objectives and features in view, the present invention consists in the details of construction and combination of parts, as will be more fully understood from the following description when read in conjunction with the accompanying drawings in which:

FIG. 1 is a perspective view of the slipper of the present invention;

FIG. 2 is a view of the slipper of FIG. 1 with its vamp disassembled and flattened against the sole for storage or shipment;

FIG. 3 is a perspective view of the slipper showing its heel portion folded up and fastened by its outer edge to the upper edge of the vamp;

FIG. 4 is a fragmentary sectional view taken substantially along the line 4—4 of FIG. 3 looking in the direction of the arrows;

FIG. 5 is a perspective view showing the details of the vamp construction;

FIG. 6 is a perspective view showing the details of the sole construction;

FIG. 7 is a view of a modification of the slipper provided with quick fastener portions for releaseably attaching the vamp to the sole of the slipper;

FIG. 8 is a fragmentary sectional view taken substantially along the line 8—8 of FIG. 7 looking in the direction of the arrows;

FIG. 9 is a view of a further modification of the slipper which provides a vamp that utilizes a separate stiffener member; and FIG. 10 is a sectional view showing the stiffener member of FIG. 9 being inserted within the opening of the vamp of FIG. 9 to hold it in its erected position.

Referring to the drawings, the preferred embodiment of the slipper 10 as shown in FIG. 1 has the appearance of a conventional slipper in that it includes a sole 12 and a vamp 13 having an open toe 14. The slipper 10 differs considerably from a conventional slipper in that it is on the order of three to four times larger in size. As will be subsequently described, the vamp 13 of the slipper is releaseably held by its side edges 16 to the marginal edge 18 of the sole 12 by snap fasteners 20. Thus, as shown in FIG. 2, the vamp 13 can be disconnected and flattened to lie against the sole 12. Because of the large size of the slipper 10, the ability to disassemble the vamp 13 and confine it and the sole 12 to a small space is of advantage when it is desired to store or ship the slipper.

The slipper 10 of FIG. 1 is provided with a snap fastener portion 17 on the outer edge of the heel portion 21 of the sole 12 and a mating snap fastener portion 19 on the upper edge of the vamp 13. These snap fastener portions 17 and 19 enable the heel portion to be turned upwardly and held with its outer edge adjacent the upper edge of the vamp 13 to provide a cover over the open end of the vamp 13.

As shown in FIGS. 4 and 6, the sole 12 which is typically on the order of two to three feet in length includes a cushion or base 24 cut from a sheet of resilient, soft, plastic such as polyfoam. The piece of plastic forming base 24 is preferably about ¾ inches thick. The base 24 is covered with upper and lower pieces of fabric 27 and 28 cut from a velvety material, such as chenille. To fabricate the sole, the base 24 is centered over the lower piece of fabric 28. The upper piece of fabric 27, which is larger in size, is then placed over the base 24 with its marginal portion folding about the side edges of the base 24 and extending outwardly to join with the edge of the lower piece of fabric 28. A length of tape or binding 30 is then folded over the edges of the upper and lower pieces of fabric 27 and 28 and sewed with thread 29 along the entire periphery of the sole to form a finished marginal edge 18. Three male fastener portions 32 are then attached to the marginal edge 18 of the sole in spaced relation along either side of the front portion of the sole.

The vamp 13 in the embodiment of FIG. 1 is formed of a thin piece of resilient plastic 33, a wire frame 34, and a piece of soft fabric 35, such as chenille. As shown in FIG. 5, the wire frame 34 having a shape corresponding to the boundary of the vamp 13 is laid over the piece of plastic 33 and the side margin portions 36 of the piece of fabric 35 are folded back over the four side edges of the plastic 33 and the wire frame 34 and sewed with thread 37 to form marginal side edges 16. Three female snap fastener portions 31 are then attached in spaced relation on the marginal side edge 16 on either side of the vamp 13. The wire frame 34 is preferably formed with a slight permanent curvature whereby when the female snap fastener portions 31 on either side of the vamp are fastened to male snap fastener portions 32 on either edge of the sole 12, the bowing of the wire frame 34 causes the vamp 13 to assume the curvature of the nook closure. In FIG. 4, a cross section of the slipper is taken substantially along line 4—4 looking in the direction of the arrows in FIG. 3. Thus, FIG. 4 shows the manner in which female snap fastener portions 31 are attached to the marginal edge 16 of the vamp 13.

A modification of the slipper 10 which relates primarily to a different manner of releaseably attaching the vamp 13 to the sole 12 of the slipper is shown in FIGS. 7 and 8. Thus, in this case, instead of snap fasteners, quick fasteners in the form of a male bristle-like tape portion 40 and a female bristle-like tape portion 41 are provided to hold the vamp on the sole. The male bristle-like tape portion 40 is secured by sewing it such that it is positioned substantially vertically along the side of the front portion of sole 12, for example, and the female bristle-like tape portion 41 is secured by sewing it along the inner side edge of the vamp 13. As shown in FIG. 7, instead of a binding 30, a whisker fringe 43 is attached by sewing about the peripheral edge of the sole 12 to provide a decorative, finished, effect. A piece of female bristle-like portion 41a is sewed on the end of the heel of the sole and a piece of male bristle-like portion 40a is sewed on the upper end of vamp 13 to enable the heel portion 21 of the sole to be turned up and held against the upper edge of the vamp 13.

A further modification of the slipper of the present invention is shown in FIG. 9. In this embodiment the sole 12 is fabricated similar to that shown in FIG. 6 by providing an upper and lower piece of soft fabric 27 and 28 over a resilient plastic base 24. However, in this case the vamp 13 is formed of a piece of fabric 46 which is permanently sewed along its side edges to the sole 12 at the same time the binding 30 is sewed to form the marginal edge 18 of the sole. As noted in FIG. 9, the piece of fabric 46 is without form and lies in a limp manner on the surface of the sole 12. In order to hold the piece of fabric 46 in its erected position so as to shape the vamp 13 to provide the nook structure for the pet, a flexible sheet of relatively stiff cardboard 48 is provided. The sides of the cardboard 48 are cut to conform to the inner side edges of the vamp 13. Thus by merely causing the cardboard 48 to assume an initial curvature and then inserting it such that it is seated within the opening formed by the piece of fabric 48, the vamp 13 can be provided with the same curved form as that provided by the wire frame 34 supporting the vamp shown in FIG. 1. The slipper 10 can then be readily disassembled by removing the cardboard 48 and flattening it against the sole.

It should now be clear that the slipper 10 of the present invention represents an object which has a pleasing appearance such that it can be placed in a room of a home without detracting from the appearance thereof. In fact, the fabric forming the slipper may be chosen to blend in with the furnishings in the room. The vamp 13 provides the housing into which the pet crawls to find a cozy nook. If desired, after the pet enters into the vamp 13, the heel portion 21 of the sole 12 may be turned up and attached to the upper end of the vamp 13 by fasteners 40a, 41a shown in FIG. 7, for example, to provide an even cozier nook for the pet. The openings on the side of the vamp when the heel portion 21 is so turned up enables the pet to work his way out of the closure at will. If desired, the toe portion of the sole 12 may likewise be turned up and attached to the lower end of the vamp 13 by fasteners 40b, 41b shown in FIG. 7.

Although the invention has been described in considerable detail, such description is intended as being illustrative rather than limiting, since the invention may be variously embodied and the scope of the invention is to be determined as claimed.

Having thus set forth and disclosed the nature of the invention what is claimed is:

1. A domestic animal shelter generally in the shape of an oversized slipper comprising:

a flexible elongated sole-like base forming a cushion and having a covering of fabric material thereon, said sole-like base having a heel end and a toe end, a vamp-like hood provided on substantially the toe end half portion of said sole-like base, said vamp-like hood sloping downwardly from an entrance opening on one end thereof toward a vent opening on the toe end thereof, said vamp-like hood including a wall of fabric material having opposite sides attached adjacent opposite sides respectively on the sole-like base, and a resilient support member provided beneath said wall of fabric material, the bowing of which holds the wall of the vamp-like hood in its erect position thereby providing a nook into which an animal can burrow, and fastener elements on the heel end of said sole-like base and on the upper end of the entrance opening of the vamp-like hood, whereby the heel end half portion of the sole-like base can be urged upwardly and bent back such that its heel end can be releaseably attached by said fastener elements to the upper end of the vamp-like hood to provide for covering the entrance opening while leaving vent openings on the sides thereof.

2. The invention in accordance with claim 1 wherein said resilient support member for holding said vamp-like hood erect comprises a wire frame which extends substantially around the periphery of the fabric material forming the wall of said vamp-like hood.

3. The invention in accordance with claim 1 wherein said resilient support member for holding said hood erect comprises a sheet of flexible material which upon being bowed is adapted to be removably inserted into the entrance opening of said vamp-like hood so as to bear against the inner surface of the fabric material forming the wall thereof.

4. The invention in accordance with claim 1 wherein the sides of said vamp-like hood are releaseably attached to the sides of said sole-like base.

* * * * *